United States Patent
Ergo et al.

(10) Patent No.: US 8,196,132 B2
(45) Date of Patent: Jun. 5, 2012

(54) INTERACTIVE MULTIMEDIA APPLICATIONS DEVICE

(75) Inventors: David Ergo, Vedrin (BE); Xavier Wielemans, Braine-l'Alleud (BE); Xavier Marichal, Court-Saint-Etienne (BE)

(73) Assignee: Alterface S.A., Mont-Saint-Guilbert (BE)

( * ) Notice: Subject to any disclaimer, the term of this patent is extended or adjusted under 35 U.S.C. 154(b) by 1199 days.

(21) Appl. No.: 11/919,380

(22) PCT Filed: Apr. 26, 2005

(86) PCT No.: PCT/BE2005/000057
§ 371 (c)(1),
(2), (4) Date: Oct. 25, 2007

(87) PCT Pub. No.: WO2006/113977
PCT Pub. Date: Nov. 2, 2006

(65) Prior Publication Data
US 2009/0113389 A1    Apr. 30, 2009

(51) Int. Cl.
*G06F 9/44*    (2006.01)
*G06F 9/445*    (2006.01)
(52) U.S. Cl. .................... 717/172; 717/121

(58) Field of Classification Search .......... None
See application file for complete search history.

(56) References Cited

U.S. PATENT DOCUMENTS

| | | | |
|---|---|---|---|
| 5,534,917 A | 7/1996 | MacDougall et al. | |
| 5,563,988 A | 10/1996 | Maes et al. | |
| 2001/0028463 A1 | 10/2001 | Iwamura | |
| 2004/0128342 A1* | 7/2004 | Maes et al. | 709/200 |
| 2005/0207730 A1 | 9/2005 | Iwamura | |

FOREIGN PATENT DOCUMENTS

EP    1 133 190 A    9/2001

* cited by examiner

*Primary Examiner* — Chuck Kendall
(74) *Attorney, Agent, or Firm* — Fisher Technology Law, PLLC (57) ABSTRACT

An interactive multimedia applications device and method for an interactive multimedia application comprises one or more live media capture devices providing a media stream, an engine comprising a real time media processing module for processing said media stream, and rendering means connected to multimedia output devices. In addition, said device comprises (i) a virtual scenario description repository adapted for storing a plurality of scenarios expressed in a scenario programming language; (ii) a memory module adapted for storing an internal representation of one of said scenarios, and an internal representation of a virtual scene and (iii) a parser/loader for parsing a selected one of said plurality of scenarios, and loading it in said memory module.

23 Claims, 7 Drawing Sheets

INTERACTIVE MULTIMEDIA APPLICATIONS DEVICE

BACKGROUND

1. Technical Field

The invention relates to the field of interactive multimedia applications. More particularly, the invention relates to a device and method for building specific interactive multimedia applications based on a generic core.

2. Description of Related Art

Entertainment parks, museums, exhibitions, trade shows and training systems make an increasing use of interactive multimedia applications to present multimedia contents (which can be cultural, informative, commercial, fun or a mix of them) to their audience in an original and attractive fashion. Natural interactions, using touch screens, gesture recognition, speech recognition, contextual knowledge about the user or the local environment are particularly desirable. It not only makes the contents accessible to a wide variety of users in a very natural and intuitive way, but it also contributes to the originality, attractiveness and fun of the multimedia experience. Such concerns of the edutainment sector apply to many other sectors where interaction is heavily used, with a growing users' demand to make it more natural: industry, communication and advertising, simulation, training, military, medical, spatial, etc.

Figure 1:
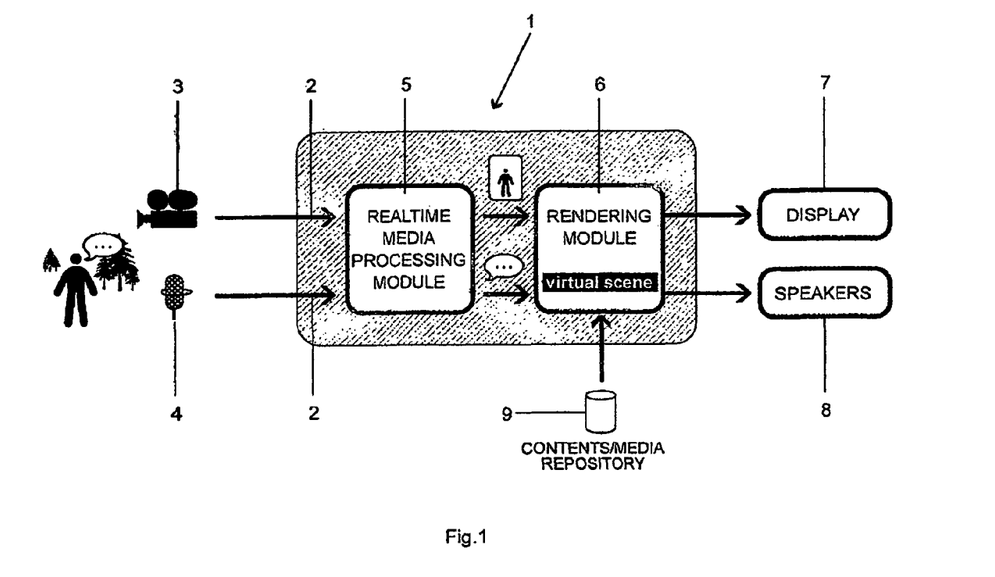
FIG. 1 is a schematic view of a multimedia device according to a known architecture, wherein a user is embedded in a predefined virtual scene.

A known architecture of a typical multimedia applications device 1 is shown on FIG. 1. Live data 2 from the camera 3/microphone 4 is acquired by the real-time media processing module 5 which performs background/foreground segmentation and audio processing. The processed video/audio stream is then fed into a rendering module 6, which blends it with virtual scene elements stored in a contents/media repository 9. The rendering result is then sent to video/audio output devices such as a display 7 and a speaker 8. In a system built according to this architecture, the set of possible real-time media processing is statically defined in processing module 5. Such a system is therefore difficult to adapt to a different application, having a different virtual scene with different requirements.

The ITU has established a "Multimedia Content Description Interface" under the name MPEG-7 (ref. ISO/IEC JTC1/SC29/WG11N5525). In addition to demonstrating how descriptors are beneficial to a large bunch of applications, MPEG-7 standardizes syntax for the establishment of generic descriptors, along with a description language. Yet, it does not propose any specific structure for interaction software, nor does it mention any way to manage such descriptors.

PRIOR ART DISCUSSION

U.S. Pat. No. 6,782,539 discloses a data processing apparatus according to said known architecture for a video special effects system wherein a core program interacts with and controls operation of a plurality of plug-in program objects each having a special dedicated function such as motion tracker, lighting effect, rendering. This document addresses the problem of interfacing a core program with plug-ins having an asynchronous interface, such as hardware plug-ins, and plug-ins having a synchronous interface, such as software plug-ins. This document, however, does not provide a real-time multimedia system, processing live data.

A real-time video image based control system according to this same architecture is known e.g. from U.S. Pat. No. 5,534,917. In this system, a very crude analysis of the video signal is performed in order to detect when user movements overlap areas of interest. However, the signal processing scheme is defined once and for all. No means are provided for adapting the devices to other applications without extensive re-programming. In addition, this system only processes a video signal. Another real-time video image based control system is known from U.S. Pat. No. 5,563,988. This system allows interactivity of a user with agents, and comprises means for measuring relative position of the user with respect to agents located in the foreground and in the background. However, this system also needs extensive reprogramming for building a new application: a different modeling database must be designed for different agents, having a different sensory system, different needs, a different repertoire of activities, and a different activity-selection system. The activity generator, the agent rendering module and the location tracking module must also be re-programmed accordingly. By adding interactivity to the system through live video analysis and triggers evaluation, these two systems greatly enrich experience proposed to the user. But the complexity of real-time signal processing and analysis makes these systems hard to design, maintain, and evolve. Furthermore, constant and fast evolution of capture devices, signal processing and analysis, algorithms and computer systems performances make system maintenance a key issue. The processing and analysis modules are constantly to be upgraded and re-designed. The two factors of complexity and high maintenance needs are a problem in systems according to this known architecture, limiting the design of new applications.

There is therefore a need for an interactive multimedia system architecture allowing one to develop a wider range of more flexible and more generic applications.

SUMMARY OF THE INVENTION

The present invention overcomes the shortcomings of the conventional art and may achieve other advantages not contemplated by conventional devices.

According to a first aspect of the invention, an interactive multimedia applications device for an interactive multimedia application, comprises one or more live media capture devices providing a media stream, an engine comprising a real-time media processing module for processing said media stream, and rendering means connected to multimedia output devices. In addition, said device comprises (i) a virtual scenario description repository adapted for storing a plurality of scenarios expressed in a scenario programming language, (ii) a memory module adapted for storing an internal representation of one of said scenarios, and an internal representation of a virtual scene, (iii) a parser/loader for parsing a selected one of said plurality of scenarios, and loading it in said memory module. In the context of the present invention, we define that "live media" can be comprised of video and/or audio data, but can also be comprised of other real time acquired data such as temperature, pressure, position, and other environment sensors.

Preferably, said parser/loader is adapted for parsing triggering rules from said virtual scenario repository and for loading an internal representation of said triggering rules into said memory module; said real-time media processing module comprises means for extracting a descriptor stream from said media stream, and attaching said descriptor stream to said media stream; and said engine comprises triggers evaluation means adapted for receiving said descriptor stream, said internal representation of triggering rules, and for updating said virtual scene in response to said descriptor stream and said triggering rules.

In a more preferred embodiment of the invention, said real-time media processing module is comprised of a plurality of plug-in modules, a plug-in module in the plurality performing a specific processing of said media stream and/or performing the extraction of a descriptor stream from said media stream and/or descriptor stream.

Preferably, said plurality of plug-in modules comprises one or more plug-in modules for processing a descriptor provided by a predecessor plug-in module.

Said plurality of plug-in modules may comprise one or more splitter plug-in modules having a single input media and/or descriptor stream, and a plurality of output media and/or descriptor streams or merger plug-in modules having a plurality of input media and/or descriptor streams, and a single output media and/or descriptor streams.

Said plurality of plug-in modules may also comprises parallel chains of plug-in modules working in dependence of settings, and means for linking the settings of corresponding plug-ins in said parallel chains or means for synchronizing the media and/or descriptor streams in said parallel chains.

Preferably, said trigger evaluation means is adapted for dynamically loading a plug-in module into said chain of plug-in modules and/or dynamically creating a new chain of plug-in modules in response to said descriptor stream and/or said triggering rules.

In a more advantageous embodiment of the invention, said scenario programming language is adapted for defining a descriptor grammar, and said plurality of plug-in modules comprises plug-in modules adapted for extracting descriptors pursuant to said descriptor grammar. The engine is then independent of said descriptor grammar. The engine may advantageously comprise means adapted for verifying that said plug-in modules adapted for extracting said descriptors produce descriptors according to said descriptor grammar.

The descriptors and/or descriptor grammar may advantageously be processed in binary form by the engine and plug-in-modules.

According to a second aspect of the invention, a method is provided for creating an interactive multimedia application for an interactive multimedia applications device comprising one or more live media capture devices providing a media stream, an engine comprising a real-time media processing module for processing said media stream, and rendering means connected to multimedia output devices, comprising the steps of:

providing a virtual scenario description repository adapted for storing a plurality of scenarios expressed in a scenario programming language;

providing a memory module adapted for storing an internal representation of one of said scenarios, and an internal representation of a virtual scene;

providing a parser/loader for parsing a selected one of said plurality of scenarios, and loading it in said memory module.

Preferably, the method comprises the steps of:

parsing triggering rules from said virtual scenario repository and loading an internal representation of said triggering rules into said memory module;

extracting a descriptor stream from said media stream, and attaching said descriptor stream to said media stream;

receiving said descriptor stream, said internal representation of triggering rules, and updating said virtual scene in response to said descriptor stream and said triggering rules.

In a more preferred embodiment of the invention, the method comprises the step of providing a plurality of plug-in modules, a plug-in module in the plurality performing a specific processing of said media stream and/or performing the extraction of a descriptor stream from said media stream and/or descriptor stream.

Preferably, the method, a plug-in module in said plurality of plug-in modules may process a descriptor provided by a predecessor plug-in module.

A plug-in module in said plurality of plug-in modules may perform the step of splitting a single input media and/or descriptor stream into a plurality of output media and/or descriptor streams, or merging a plurality of input media and/or descriptor streams into a single output media and/or descriptor streams.

Preferably, the method comprises the steps of providing parallel chains of plug-in modules working in dependence of settings, and linking the settings of corresponding plug-ins in said parallel chains, or synchronizing the media and/or descriptor streams in said parallel chains.

Preferably, the method comprises the step of dynamically loading a plug-in module into said chain of plug-in modules and/or dynamically creating a new chain of plug-in modules in response to said descriptor stream and/or said triggering rules.

In a more advantageous embodiment, the method comprises the steps of defining a descriptor grammar, providing one or more plug-in modules adapted for extracting descriptors pursuant to said descriptor grammar, the engine being independent of said descriptor grammar.

The engine may advantageously perform the step of verifying that said plug-in modules adapted for extracting sa id descriptors produce descriptors according to said descriptor grammar.

The engine and plug-in modules may perform the step of processing descriptors and/or descriptor grammar in binary form.

According to a third aspect of the invention, one or more computer-readable media are provided having stored thereon a computer program for performing any of the above methods.

Other aspects and advantages of embodiments of the invention will be discussed with reference to the figures and to the detailed description of preferred embodiments.

BRIEF DESCRIPTION OF THE DRAWING FIGURES

FIGS. 4a and 4b1 to 4b4 show schematically how processing modules can be connected for obtaining a processing chain.

DETAILED DESCRIPTION

Figure 2:
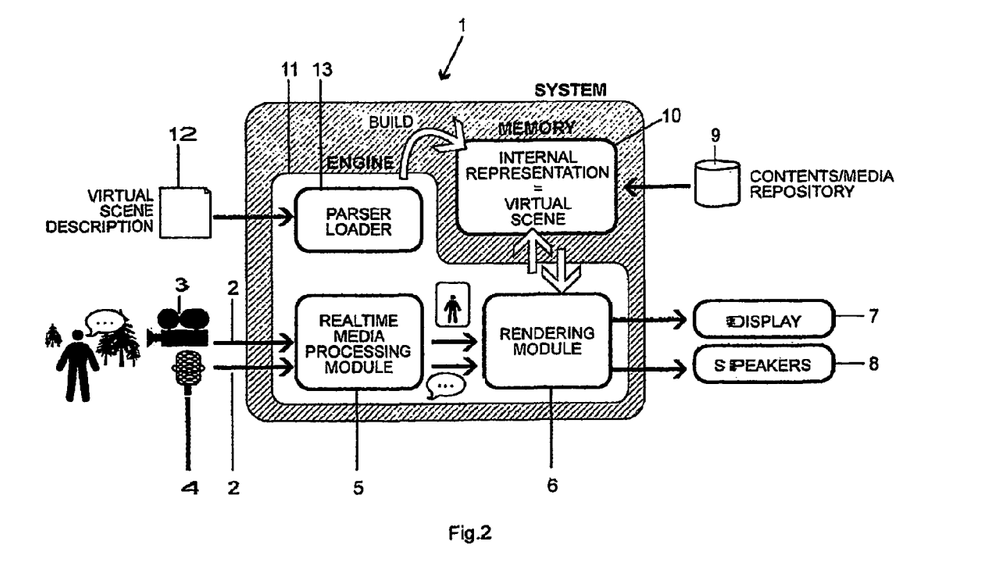
FIG. 2 is a schematic view of a multimedia applications device according to the invention, wherein a user is embedded in a variable virtual scene.

FIG. 2 schematically illustrates a multimedia applications device according to the present invention, where elements similar to elements of the device of FIG. 1 have same numbers. In contrast to the known multimedia devices, the virtual scene contents and composition is not known in advance, but may be changed according to the application's requirements. The virtual scene, its behavior, audiovisual contents and the way live media streams need to be integrated within it are described in a separate document, called "the scenario", sometimes referred to as "the contents", "the game" or "the model". The device 1 is comprised of two components: a memory 10, for storing application dependent data, and an engine 11, for storing and executing application independent data and code. An "engine", in the context of the present application, is a hardware/software combination designed to perform a set of standard, generic functions depending on configuration data. The engine 11 can process a broad set of types of data, and is therefore generic to a wide range of applications. A virtual scenario description repository 12 is provided and a scenario is parsed and loaded into memory 10 by parser/loader 13, under a coded internal representation. A Contents/Media repository 9 contains audio, video or other data under coded form, which can be loaded according to scenario need, in real-time. The variable data are stored in the memory module 10, while the engine 11 remains independent of contents and virtual scene. The rendering module 6 updates the representation of the virtual scene in memory 10, according to the processed scene. In turn, the internal representation in memory 10 is used by the rendering module 6 for determining the appearance to be sent to the output devices such as the display 7 and speakers 8. The advantage of this architecture according to the invention, wherein scenario and engine are separated, is that a single, unique hardware/software engine 11 may be used to produce an infinity of virtual reality setups, simply by providing it with different scenarios.

The virtual scenario is described in a specific language, for instance an XML language (eXtendible Markup Language). The parser/loader 13 may then first read an XML schema defining the set of tags, with their structure and arguments. The parser/loader 12 then reads the actual scenario, expressed in said XML language. In the parsing operation, the syntactic validity of the scenario is verified. In the loading operation, in-memory structures are created, reflecting the scenario. These memory structures are optimized for fast access and real-time processing. By using the step of reading a scenario written in a specific language, any new kind of interactive multimedia application can be built using the sane device, without changing anything in the engine 11 or memory 10.

Figure 3:
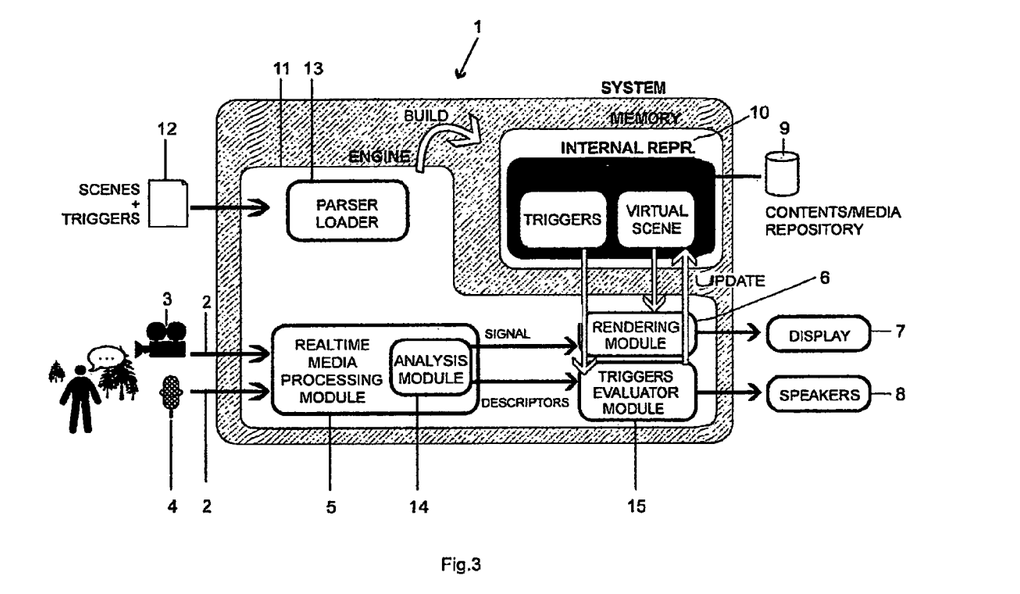
FIG. 3 is a schematic view of an interactive multimedia applications device according to a preferred embodiment of the invention, wherein a user interacts with a variable virtual scene.

FIG. 3 shows a preferred embodiment of the invention, wherein interactivity between user(s) and scenario is provided. The scenario document stored in the virtual scenario description repository 12 now includes so-called "triggers" in addition to the scene description. Triggers are condition/action pairs where the action is performed only if the condition is met. An example of a trigger, as expressed under an XML-language form in repository 12 is given below:

```
<trigger condition =
"pointIn(scene.character[0].hand[1].pos, redBalloon)">
<!-- if right hand is in red balloon -->
    <exec command =
"redBalloonTrajectory.hit(scene.character[0].hand[1].speed)"/>
<!-- 'hit' red balloon with right hand's speed vector -->
    <sceneCommand sceneElem = "snd_balloonHit"
command="play"/> <!-- play 'balloon hit' sound -->
    </trigger>
```

Figure 7:
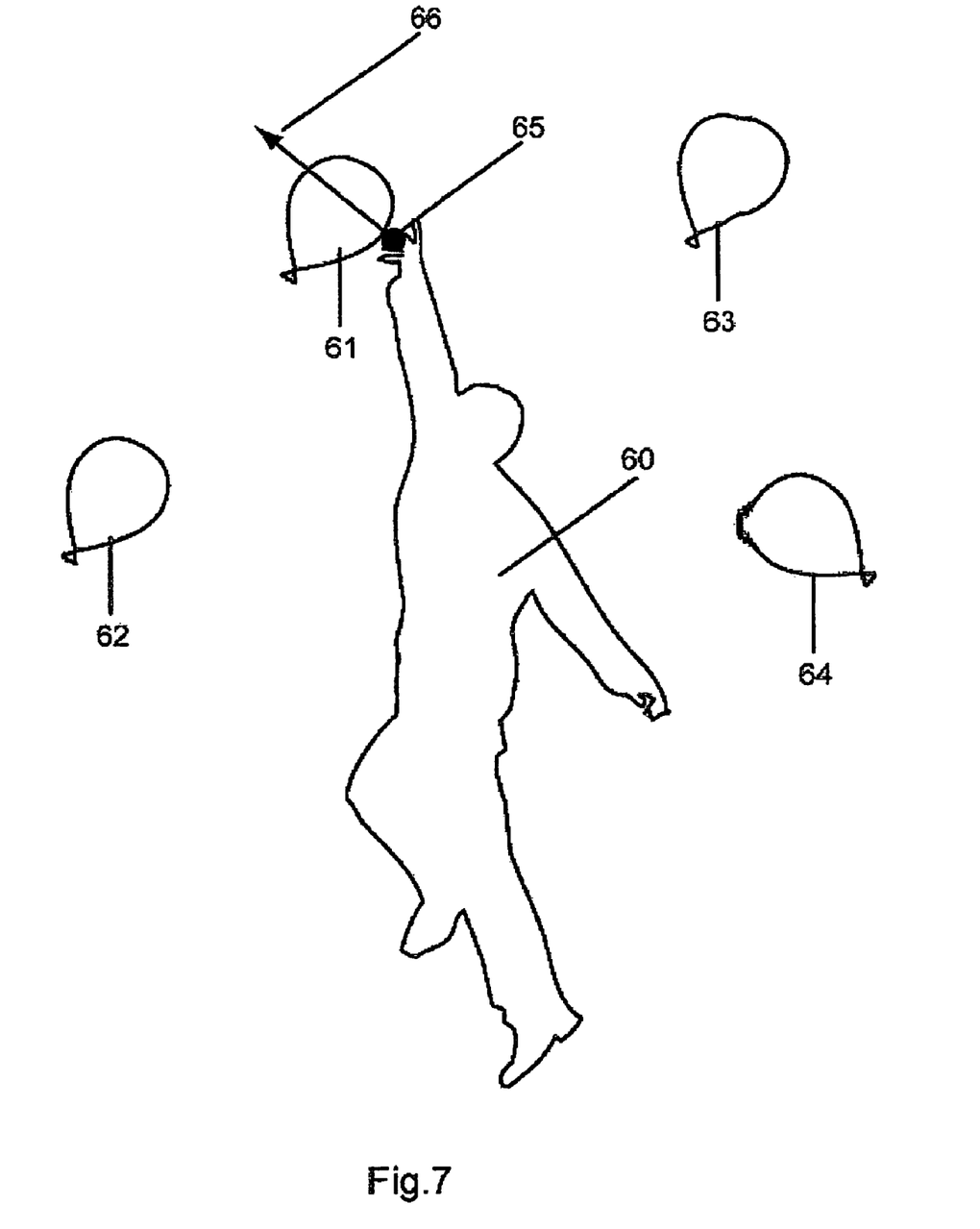
FIG. 7 illustrates an exemplary gaming application embodying the invention.

As a recurring example, illustrated by FIG. 7, we will discuss a gaming application where a player 60 is immersed in real-time into a virtual place where he has to hit virtual balloons 61, 62, 63, 64 of various colors that float around him/her in the air. The player 60 is instructed to play by making real full-body gestures (move, jump, crouch, hit,). In that context, here is a practical example of trigger: "if the player's right hand position (65) on the screen is inside the image of the red balloon 61, change the trajectory of the balloon (taking into account the player's right hand speed vector 66 and play adequate sound". The real-time media processing module 5 is now followed by an analysis module 14 extracting information, called "descriptors", from the media stream running through it and attaching these descriptors as a stream to the video/audio stream itself. Finally, next to the rendering module 6, a triggers evaluator module 15 checks trigger conditions against the descriptors stream it receives from the analysis module 14. Returning to our "color balloon game" example, at a given moment in the game, the player 60 is shown in a scene where virtual red balloons 61, 62, 63, 64 are moving. A digital camera is acquiring a video stream of the movements of said player. An analysis module 14 analyzes said stream for identifying the player (character [0]), his right hand (character [0].hand [1]), and attach the position thereof (character [0].hand[1].pos) to the descriptor. In the same way, the player's hand speed would also be detected. These two values are attached to the video stream as a descriptor. Based on these values, and on the known position and speed of the virtual red balloon 61, the triggers evaluator module 15 determines when the user's right hand touches the red balloon. The triggers evaluator module 15 then updates the current virtual scene accordingly, for instance by modifying the speed of the virtual red balloon 61 and by playing a 'balloon hit' audio element. A projection screen and a pair of loudspeakers are placed above the camera, showing the real-time virtual reality setup back to the player that thus sees him/herself immersed in a virtual multimedia environment, resulting in a kind of "magic mirror" effect. Interaction between the character and the virtual scene is now possible: the player, by occupying a certain position or performing certain movements, defined in the scenario, may trigger specific multimedia events. Such an effect can be obtained with a standard engine 11 by providing a specific scenario and contents/media to said engine 11.

Figure 4A:
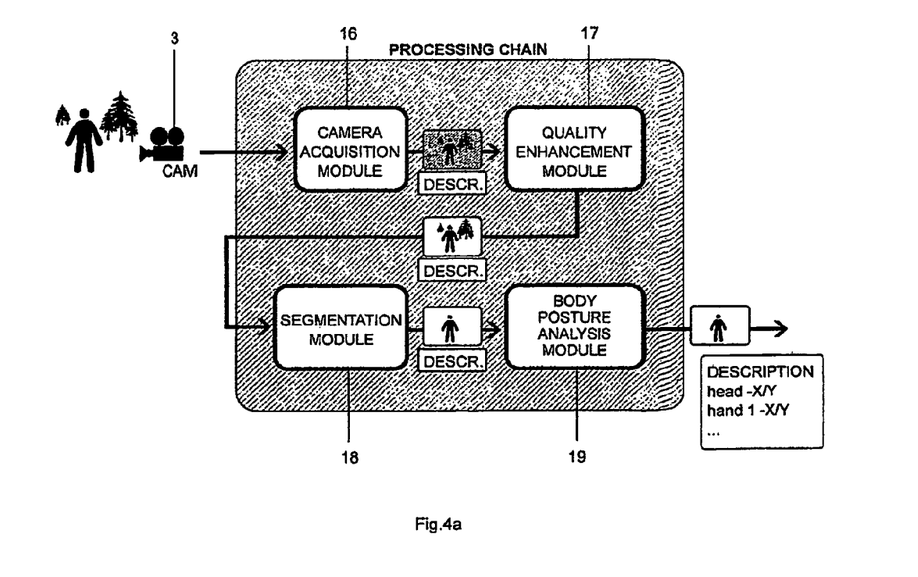
Figure 4B:
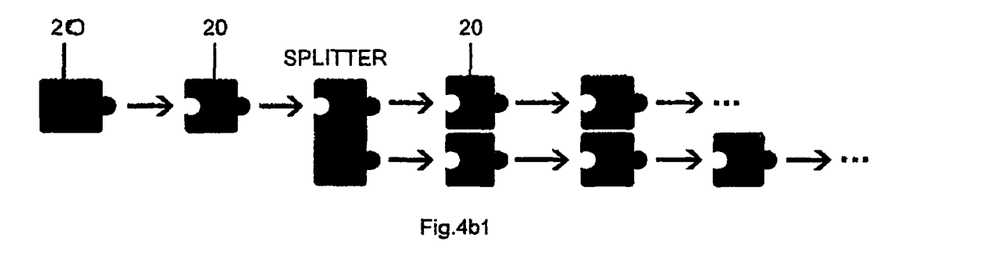
Figure 4B:
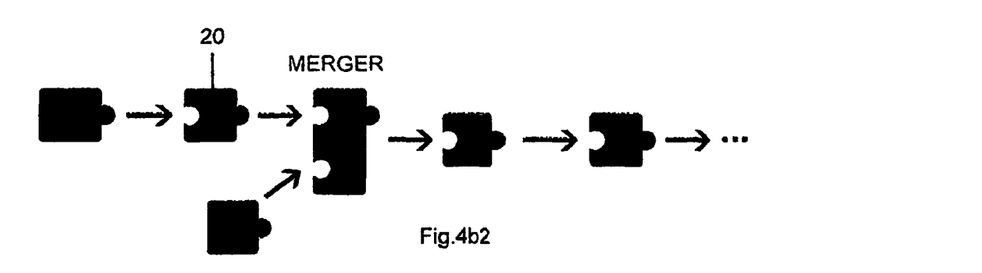
Figure 4B:
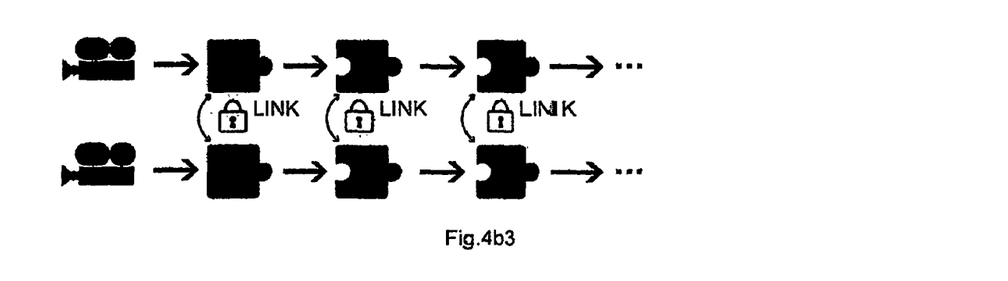
Figure 4B:
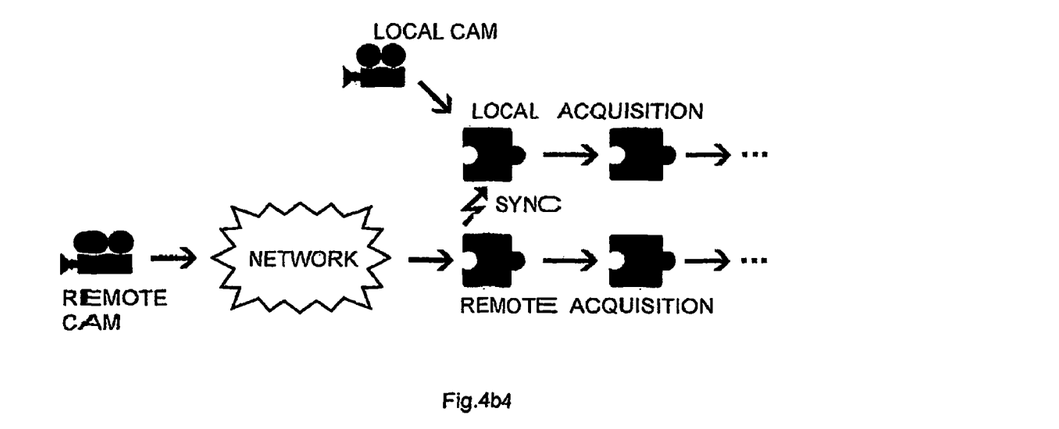

FIG. 4a displays a typical example of a processing chain for a video signal, in which several simple modules are plugged one after the other to compose a sophisticated real-time signal processing and analysis operation e.g. a camera acquisition module 16 for acquiring a video signal from an analog or digital camera 3, an image quality enhancement module 17 for de-noising, equalizing brightness and contrast, adding sharpness, a background/foreground segmentation module 18, a body posture analysis module 19 for detecting head/hands/feet position and extracting a descriptor stream from said video stream. Similarly, another chain may be used in parallel for processing an audio signal. Each module in a processing chain modifies the multimedia stream and/or extracts descriptors from it and attaches them to the media stream itself. Besides, almost all modules share a common input-output interface, making any block pluggable to any other. Each of the black arrows of FIG. 4a, as well as FIG. 4b may represent a media stream associated or not with a descriptor stream. A plug-in module 20 in a chain may be designed to process a descriptor provided by a predecessor plug-in module 20 for instance for enhancing or improving the descriptor.

However, some special modules such as mergers and mixers depart partially from that one-to-one interface and allow for even more flexibility in the creation of complex chains, as illustrated by FIG. 4b. In FIG. 4b1, a chain of plug-in modules 20 is split in two sub-chains by a block featuring two output plugs. These two outputs may for instance be exact copies of each other which undergo different plug-in chains for different interactions, or for instance correspond, in case of a video signal, to the left and right halves of the input video image undergoing different treatments. In FIG. 4b2, two chains of plug-in modules 20 are merged together and become a single one, thanks to a merger module integrating both signals. These two signals could be of the same type (two video or audio signals mixed together) or not (a video signal and an audio signal are mixed by generating pseudo-random visualizations from the audio signal and superimposing them on the original video signal). Such a situation can for instance be used for an artistic exhibit where images on a presentation screen vary according to both the gesture and sound performed by an actor. In FIG. 4b3, corresponding blocks included in parallel chains are linked with each other so that changes to the settings of one are reflected automatically on the other, simplifying the system configuration. This can for instance be used for multi-players systems where every player interacts through his Own sensor and where all sensors (and analysis chains), must obey to the same parameters. In FIG. 4b4, two cameras form the source of two parallel processing chains, one of them being locally connected to a PC, while the other is remotely connected through a network interface. The remote camera acquisition module forces the local acquisition module in the other chain to synchronize itself with it, so that one new frame is grabbed from the local camera only when a frame arrives from the remote one. This arrangement avoids the local chain to take up all the available computing power. The man skilled in the art will easily generalize the many possibilities arising from such combination of processing chains. Although FIG. 5 displays a simple linear arrangement of plug-in modules 20, these modules may be arranged in different ways any of the different ways discussed here.

Figure 5:
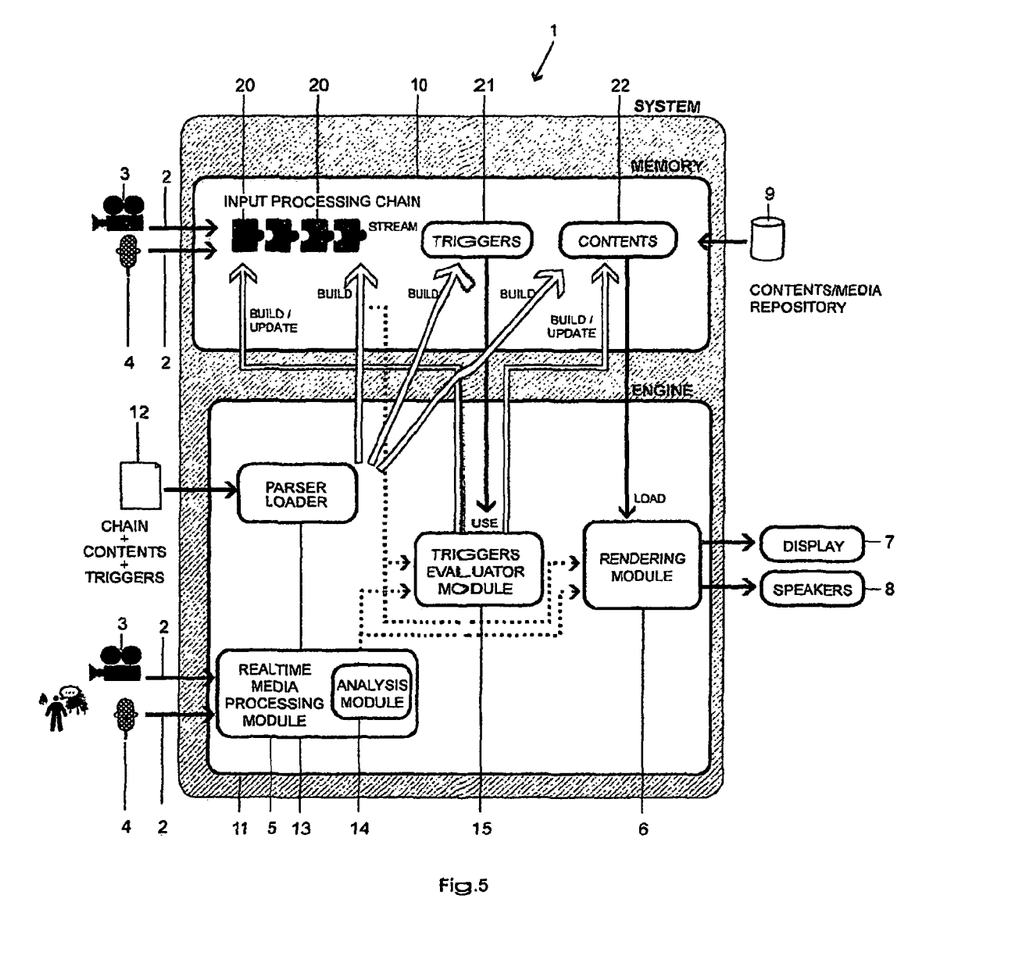
FIG. 5 is a schematic view of an interactive multimedia applications device according to another preferred embodiment of the invention and shows the relevance of using plug-ins in this framework.

FIG. 5 is a schematic view of an interactive multimedia applications device 1 according to an embodiment of the invention. In this device, the real-time media processing module 5 and/or the rendering module 6 of the device of FIG. 3 are replaced by a chain of plug-in modules dynamically loaded into memory by the parser/loader, according to scenario needs. The device 1 thus comprises a memory 10 capable of storing a chain of plug-in modules 20, triggers storage 21 and a contents storage 22. The engine 11 comprises a parser/loader 13, a triggers evaluator module 15 capable of detecting events requiring the load or unload of a plug-in module in the media processing chain or in the rendering processing chain. The parser/loader 13 dynamically builds the chain of processing modules, based on their description in the scenario (outline arrow labeled 'build'). This chain of plug-in modules 20 is then dynamically managed by the triggers evaluator of the engine (along with the audiovisual contents. The triggers evaluator module 15 has the power to add/modify/remove a plug-in 20 in the chain or to modify its functional configuration at any time, according to specific instructions of the scenario itself (outline arrows labelled 'build/update').

Figure 6:
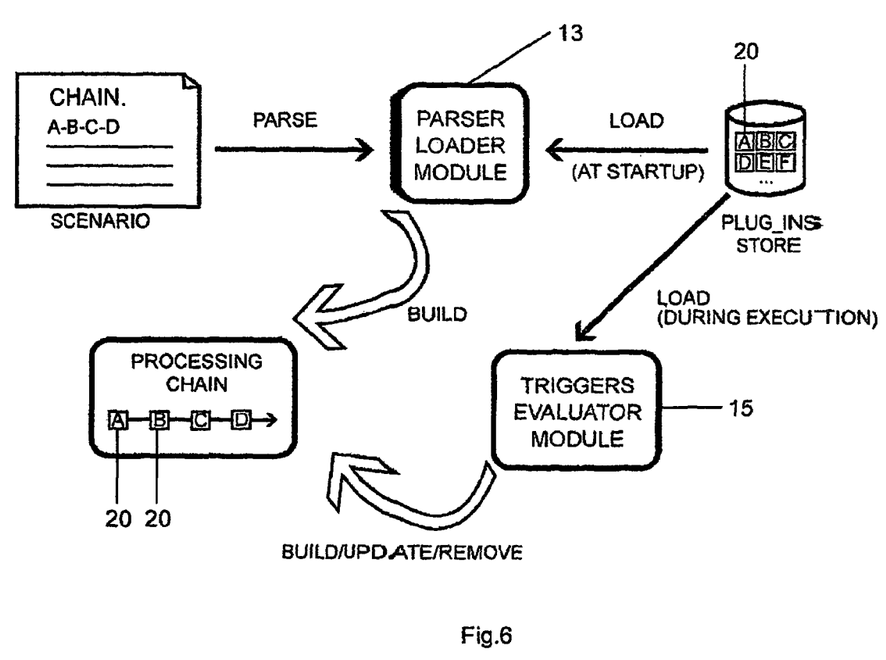
FIG. 6 illustrates how plug-in modules are loaded at start-up of application and during execution

As illustrated on FIG. 6, plug-in modules 20 may not only be loaded during the initial phase of scenario parsing/media loading; they may as well be loaded (or unloaded) at any time during scenario execution. In that case, plug-in loading/unloading is initiated by the triggers evaluator module 15. When a certain condition or event is met, the triggers evaluator module 15 either loads a new plug-in module 20 and inserts it at a certain position in the processing chain, or removes an existing plug-in module from the chain. In case of more radical changes in the scenario, it is even possible to totally create a new processing chain from scratch, by loading all appropriate plug-in modules, and/or to completely cancel the existing chain by unloading all the plug-in modules composing it.

As an example, consider the previously presented "balloons game" of FIG. 7: if, at the end of the game, the player 60 has made a sufficient score, he/she enters the "board of top scores" in which a short video sequence shows him/her captured and archived for further presentation, along with the other best players. The scenario specifies that, instead of just displaying the raw video clips, the engine must filter each of them in real-time using a randomly chosen filter, picked amongst a pool of existing effects. Each filter corresponds to a plug-in module (or to a mini-chain of several plug-in modules if some analysis is required before applying the effect itself). The use of plug-in modules would allow new effects to be added regularly during the life cycle of the game. For instance, "seasonal" effects might override the random choice (like a virtual Santa's suit painted on the player during Christmas period).

As shown in the "balloons game" example discussed above, for a given interactive application, descriptors extracted from the live media stream have a well defined structure and meaning, closely related to the application itself. For instance, a full-body interaction game like the "balloons game" uses descriptors such as continuous data (character position, size, orientation of global body, head, hands and feet) or discrete events (character entering/leaving camera field, jumping with vertical speed $V_y$, performing the "catch" gesture with left hand at position (x,y)), whereas a remote finger-pointing application would introduce completely different descriptors, like finger and eye position in 3D space, corresponding (x,y) position in 2D scene, events "character starts/stop pointing" and "pointer starts moving/stops on position (x,y)". Each application actually may define its particular descriptors language, as a combination of syntax (structure) and semantics (meaning). To be able to handle several descriptors languages, the engine of a preferred device according to the invention may integrate an open descriptors infrastructure, presented in FIG. 8. According to this open descriptors infrastructure, an application designer may design three cooperating components: (i) a new descriptor structure, (ii) a plug-in module 20 capable of extracting and attaching said new descriptor to a data stream, and (iii) a trigger capable of processing said new descriptor and provide relevant application response. The new descriptor language is defined by a particular descriptor grammar 23, which is a formal reference written in a unique meta-language understood by the engine 11. At plug-in load time, the engine 11 verifies that the new descriptor 20 matches the descriptor grammar 23.

Figure 8:
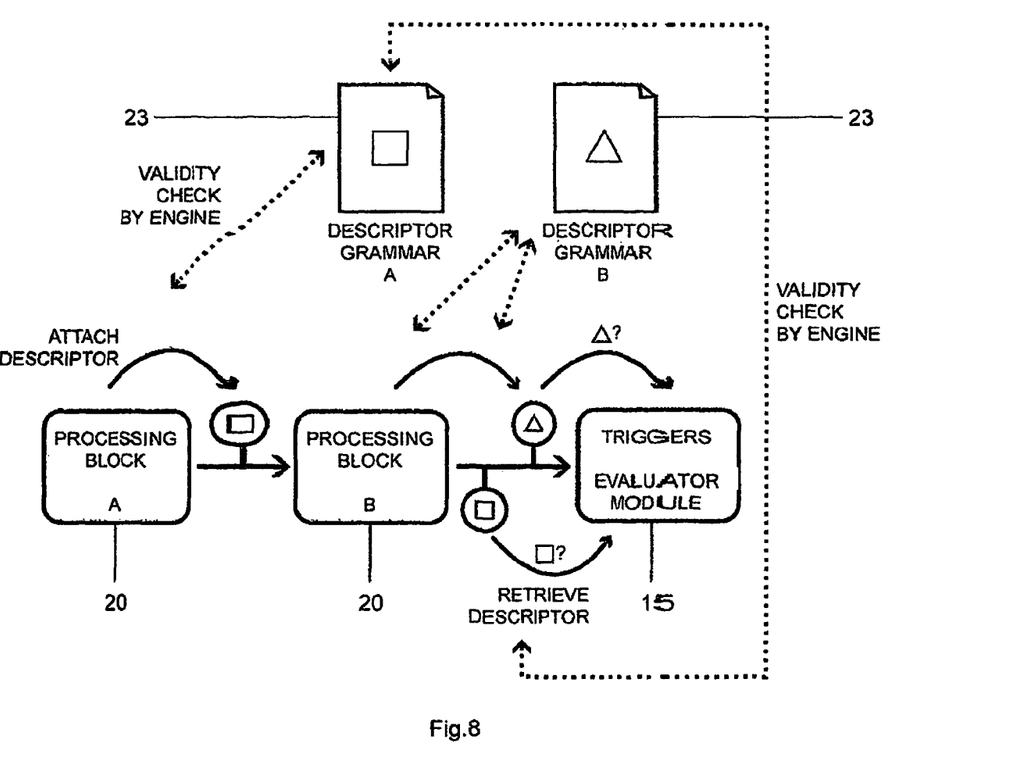
FIG. 8 illustrates another embodiment of the invention wherein descriptors may be defined by the scenario.

Each new plug-in module 20 may use a certain descriptors language, create and attach descriptors expressed in that language to the live media stream it analyses. Then any scenario trigger using this plug-in in one of its processing chains may use the current values of said descriptors to control its own audio-visual contents or its processing chains. To illustrate this, here is an excerpt (presented in a pseudo-C language) from a typical descriptors grammar that would be used in a multiple-player version of the previously described "color balloons game". This grammar allows a scene to be described, consisting of several characters, each having a body composed of several limbs, themselves in turn having each a certain position/size/orientation. Besides this continuously updated scene description, the grammar defines discrete events (precise times at which certain conditions are met in the processed audiovisual stream) that may additionally be detected and signalled by the analysis plug-in modules.

```
struct {
    point pos;
    int width, height;
    float angle;
} Limb;
struct {
    int index;
    point pos;
    int width, height;
    Limb head, hand[2], foot[2];
} Body;
struct {
    int numCharacters;
    Body character[ ];
} Scene;
Scene scene;
event characterEnter(int characterIndex);
event characterLeave(int characterIndex);
event jump(int characterIndex, double speed);
event catch(int characterIndex, int hand, point position);
event give(int fromCharacterIndex, int toCharacterIndex, int hand)
// . . .
```

We see that the grammar recursively defines what a scene is, then declares a single, global instance of the newly defined 'Scene' type. Then the list of events allowed by the grammar, each with its own format (number and type of arguments) is presented.

A plug-in module 20 adapted for treating the descriptors language defined by this descriptor grammar 23 will have to continuously attach to the stream an up-to-date scene description, and will be able to signal additional events when it detects them. It could for instance perform the following descriptors attachment operations:

```
setValue("scene.numCharacters", 4);
setValue("scene.character[2].hand[1].pos", rightHandPosValue);
// Update the current value of various elements in the scene.
setEvent("characterEnter", 3);
// Signalling that a new character has entered the scene,
// it is given character index 3.
setEvent("give", 1, 0, LEFT_HAND);
// Signalling that character #1 has performed the 'giving' gesture
// with his left hand towards character #0.
```

Similarly, at the other end of the engine, a scenario using this plug-in module 20 (called analyzerX) will be able to retrieve data from the scene description and react to the signalled events. It could for instance perform descriptors retrieval/event handling operations illustrated by the following pseudo-C excerpts (although the scenario can be expressed in any other language, for instance in XML):

```
int nc = analyzerX.scene.numCharacters;
// Retrieving the current number of characters in the scene.
if (analyzerX.scene.character[i].width <
        analyzerX.scene.character[j].width) { /* do something */ }
// Comparing the width of characters i and j.
onEvent(analyzerX, "catch", c, h, pos) {
    if pointIn(pos, redBalloon) {
        attachObjectToHand(redBalloon, c, h);
            play(balloonCaughtSound);
    }
}
// Event handler: everytime the 'catch' event is signalled
// by the analyzer plug-in, check if the catching position
// is inside the red balloon image, and if so attach
// the balloon to the corresponding hand of the involved
// character and play the adequate sound.
```

The above example clearly shows the interest of allowing each interactive application to define its own descriptors language(s). On both sides (plug-in modules and triggers), it makes the code much more concise and closer to the application domain, thus easier to develop and maintain. It is important to stress that the engine, while driving the descriptors infrastructure, does not have to know anything in advance about the specific structure and meaning of the descriptors languages involved in the scenario when it runs. It provides a transparent communication channel from plug-in modules to scenarios (triggers). Furthermore, while allowing the engine to support an infinity of descriptors languages, such an open infrastructure still ensures a complete validity control of the descriptors it handles: indeed, as stated earlier, each descriptors language is defined by its own grammar. A plug-in module 20 using a particular descriptors language will include in its code a reference to the corresponding grammar 23 document, so that the engine can use it to validate and perform descriptors attachment or retrieval operations ordered by the plug-in module or the scenario, respectively. Nothing can be done which is not perfectly compliant with the language defined by the grammar: for instance, access path to a particular sub-element of the descriptors complex data structure (like scene.character[i].hand[LEFT_HAND].pos in the above example) is controlled; the type of any value added to the data structure or passed as a parameter of an event is also checked for compatibility with corresponding type definition in the grammar: you cannot attach a string where an int is expected, or give an event a point argument where it is supposed to take a float. Finally, another important feature of the open descriptors infrastructure is its efficiency: when descriptors attachment/retrieval operations are validated (upon plug-in module loading/scenario parsing, resp.), they are at the same time compiled into a totally binary form, much faster for the system to process and less memory-consuming. Data or event names lookup, type checking, etc. are done only once, during the engine start-up phase. Once the application actually starts running, all that remains is binary descriptors information, occupying a minimal memory space and processed as quickly as possible by the engine.

By using the device and method of the invention, a broad set of interactive multimedia applications can be created using a single engine. The application can be fully defined in a data support containing an XML schema, an XML scenario, a set of plug-ins and their descriptors languages descriptions, and a contents/media data set. This makes distribution and installation of applications fast and easy. The switch of one application to another one in a given location is also very easy. More specific changes can be performed by changes of the input or sensor devices and video/audio or other output devices, and corresponding changes in input-chain or rendering chain plug-in modules.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated. In particular, constant evolution of the available processing power and speed allow for more exhaustive computations that provide more precise results and for new algorithms that best model reality in order to best interpret the environment.

DRAWING ELEMENTS LIST

1. Multimedia applications device
2. Data
3. Camera
4. Microphone
5. Real-time media processing module
6. Rendering module
7. Display
8. Speakers
9. Contents/Media repository
10. Memory
11. Engine
12. Virtual scenario description repository
13. Parser/loader
14. Analysis module
15. Triggers evaluator module
16. Camera acquisition module
17. Image quality enhancement module
18. Background/foreground segmentation module
19. Body posture analysis module
20. Plug-in module
21. Triggers storage
22. Contents storage
23. Descriptor grammar
60. Player
61, 62, 63, 64 balloons
65. Player's hand
66. Speed vector of player's hand

The invention claimed is:

1. An interactive multimedia applications device for an interactive multimedia application, comprising
one or more live media capture devices providing a media stream;
a virtual scenario description repository adapted for storing a plurality of scenarios expressed in a scenario programming language;
an engine comprising a real-time media processing module for processing said media stream, said real-time media processing module comprising means for extracting a descriptor stream from said media stream and for attaching said descriptor stream to said media stream, said engine further comprising triggers evaluation means adapted for receiving said descriptor stream and an internal representation of triggering rules, and adapted for updating said virtual scene in response to said descriptor stream and said triggering rules;
a memory module adapted for storing an internal representation of one of said scenarios, and an internal representation of a virtual scene;
a parser/loader for parsing a selected one of said plurality of scenarios, and loading it in said memory module, said parser/loader being adapted for parsing triggering rules from said virtual scenario repository and for loading said internal representation of said triggering rules into said memory module;
rendering means connected to multimedia output devices and adapted for updating said internal representation of a virtual scene in memory module according to said media stream as processed in real-time by said processing module, and adapted for using said updated internal representation for determining the appearance to be sent to said connected multimedia output devices.

2. A device according to claim 1, wherein said real-time media processing module is comprised of a plurality of plug-in modules, a plug-in module in the plurality performing at least one of
a specific processing of said media stream; and
extraction of a descriptor stream from at least one of said media stream and said descriptor stream.

3. A device according to claim 2, wherein said plurality of plug-in modules comprises one or more plug-in modules for processing a descriptor provided by a predecessor plug-in module.

4. A device according to claim 2, wherein said plurality of plug-in modules comprises one or more splitter plug-in modules having:
at least one of a single input media stream and descriptor stream; and
a plurality of output media and descriptor streams.

5. A device according to claim 2, wherein said plurality of plug-in modules comprises one or more merger plug-in modules having:
at least one of a plurality of input media and descriptor streams; and
a single output media and descriptor stream.

6. A device according to claim 2, wherein said plurality of plug-in modules comprises:
parallel chains of plug-in modules working in dependence of settings; and
means for linking the settings of corresponding plug-ins in said parallel chains.

7. A device according to claim 2, wherein said plurality of plug-in modules comprises:
parallel chains of plug-in modules; and
means for synchronizing at least one of the media and descriptor streams in said parallel chains.

8. A device according to claim 2, wherein said trigger evaluation means is adapted for at least one of:
dynamically loading a plug-in module into said chain of plug-in modules; and
dynamically creating a new chain of plug-in modules in response to said descriptor stream and said triggering rules.

9. A device according to claim 2, wherein:
said scenario programming language is adapted for defining a descriptor grammar; and
said plurality of plug-in modules comprises plug-in modules adapted for extracting descriptors pursuant to said descriptor grammar, the engine being independent of said descriptor grammar.

10. A device according to claim 9, characterized in that said engine comprises means adapted for verifying that said plug-in modules adapted for extracting said descriptors produce descriptors according to said descriptor grammar.

11. A device according to claim 2, wherein at least one of the descriptors and the descriptor grammar are processed in binary form by the engine and plug-in-modules.

12. A method for creating an interactive multimedia application for an interactive multimedia applications device comprising one or more live media capture devices providing a media stream, an engine comprising a real-time media processing module for processing said media stream, and rendering means connected to multimedia output devices, the method comprising steps of
- providing a virtual scenario description repository adapted for storing a plurality of scenarios expressed in a scenario programming language;
- providing a memory module adapted for storing an internal representation of one of said scenarios, and an internal representation of a virtual scene;
- providing a parser/loader for parsing a selected one of said plurality of scenarios, and loading it in said memory module;
- updating said internal representation of a virtual scene in memory module according to said media stream as processed in real-time by said processing module;
- using said updated internal representation for determining the appearance to be sent to said connected multimedia output devices;
- parsing triggering rules from said virtual scenario repository and loading an internal representation of said triggering rules into said memory module;
- extracting a descriptor stream from said media stream, and attaching said descriptor stream to said media stream; and
- receiving said descriptor stream, said internal representation of triggering rules, and updating said virtual scene in response to said descriptor stream and said triggering rules.

13. A method according to claim 12, further comprising a step of providing a plurality of plug-in modules, a plug-in module in the plurality performing at least one of
- a specific processing of said media stream; and
- the extraction of a descriptor stream from at least one of said media stream and the descriptor stream.

14. A method according to claim 13, wherein a plug-in module in said plurality of plug-in modules processes a descriptor provided by a predecessor plug-in module.

15. A method according to claim 13, wherein a plug-in module in said plurality of plug-in modules performs a step of splitting at least one of a single input media and the descriptor stream into at least one of a plurality of output media and descriptor streams.

16. A method according to claim 13, wherein a plug-in module in said plurality of plug-in modules performs a step of merging at least one of a plurality of input media and descriptor streams into a single output media and descriptor stream.

17. A method according to claim 13, further comprising steps of
- providing parallel chains of plug-in modules working in dependence of settings, and
- linking the settings of corresponding plug-ins in said parallel chains.

18. A method according to claim 13, further comprising steps of
- providing parallel chains of plug-in modules, and
- synchronizing the media and descriptor streams in said parallel chains.

19. A method according to claim 13, further comprising at least one of the steps of
- dynamically loading a plug-in module into said chain of plug-in modules; and
- dynamically creating a new chain of plug-in modules in response to at least one of said descriptor stream and said triggering rules.

20. A method according to claim 13, further comprising steps of:
- defining a descriptor grammar, and
- providing one or more plug-in modules adapted for extracting descriptors pursuant to said descriptor grammar, the engine being independent of said descriptor grammar.

21. A method according to claim to 20, wherein said engine performs the step of verifying that said plug-in modules adapted for extracting said descriptors produce descriptors according to said descriptor grammar.

22. A method according to claim 13, wherein the engine and plug-in-modules perform the step of processing descriptors and descriptor grammar in, binary.

23. At least one computer-readable medium having stored thereon a computer program able to control a processor to perform the method of claim 12.

* * * * *